US012765532B2

(12) United States Patent
Okamoto

(10) Patent No.: US 12,765,532 B2
(45) Date of Patent: Oct. 20, 2026

(54) HEATING TRANSPIRATION COMPOSITION, AND METHOD FOR EXTERMINATING HARMFUL ARTHROPODS USING SAME

(71) Applicant: SUMITOMO CHEMICAL COMPANY, LIMITED, Tokyo (JP)

(72) Inventor: Hiroshi Okamoto, Hyogo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 420 days.

(21) Appl. No.: 18/285,558

(22) PCT Filed: Apr. 1, 2022

(86) PCT No.: PCT/JP2022/016996
§ 371 (c)(1),
(2) Date: Oct. 4, 2023

(87) PCT Pub. No.: WO2022/215668
PCT Pub. Date: Oct. 13, 2022

(65) Prior Publication Data

US 2024/0180138 A1 Jun. 6, 2024

(30) Foreign Application Priority Data

Apr. 5, 2021 (JP) ................................. 2021-063990

(51) Int. Cl.

| | |
|---|---|
| ***A01M 1/20*** | (2006.01) |
| ***A01N 37/08*** | (2006.01) |
| ***A01N 65/12*** | (2009.01) |
| ***A01P 7/04*** | (2006.01) |

(52) U.S. Cl.
CPC ........ *A01M 1/2061* (2013.01); *A01M 1/2016* (2013.01); *A01N 37/08* (2013.01); *A01N 65/12* (2013.01); *A01P 7/04* (2021.08)

(58) Field of Classification Search
None
See application file for complete search history.

(56) References Cited

U.S. PATENT DOCUMENTS

| | | | |
|---|---|---|---|
| 2003/0138500 A1 | 7/2003 | Parker et al. | |
| 2013/0005688 A1 | 1/2013 | Saunders et al. | |

FOREIGN PATENT DOCUMENTS

| | | | | |
|---|---|---|---|---|
| CA | 2414656 C * | 9/2010 | ............. A01N 59/02 |
| EP | 3964068 A1 | 3/2022 | |
| JP | H09-268104 A | 10/1997 | |
| JP | 2005-120028 A | 5/2005 | |
| JP | 2007-001934 A | 1/2007 | |
| JP | 2010-065056 A | 3/2010 | |
| JP | 2010120903 A * | 6/2010 | |
| JP | 2011-012056 A | 1/2011 | |
| JP | 2011-251922 A | 12/2011 | |
| JP | 2014-152161 A | 8/2014 | |
| JP | 2019-034888 A | 3/2019 | |
| WO | 2021/010195 A1 | 1/2021 | |

OTHER PUBLICATIONS

International Preliminary Report on Patentability and Written Opinion issued in corresponding International Patent Application No. PCT/JP2022/016996 dated Oct. 19, 2023.
International Search Report issued in corresponding International Patent Application No. PCT/JP2022/016996 dated Jun. 14, 2022.

* cited by examiner

*Primary Examiner* — H. Sarah Park
(74) *Attorney, Agent, or Firm* — Morgan, Lewis & Bockius LLP

(57) ABSTRACT

The present invention provides a heating transpiration composition having an excellent efficacy on exterminating harmful arthropods, which comprises a natural pyrethrin and a pyrethroid compound, wherein the weight ratio of active ingredients of the natural pyrethrin relative to the pyrethroid compound is within the range of 20:1 to 200:1.

18 Claims, 1 Drawing Sheet

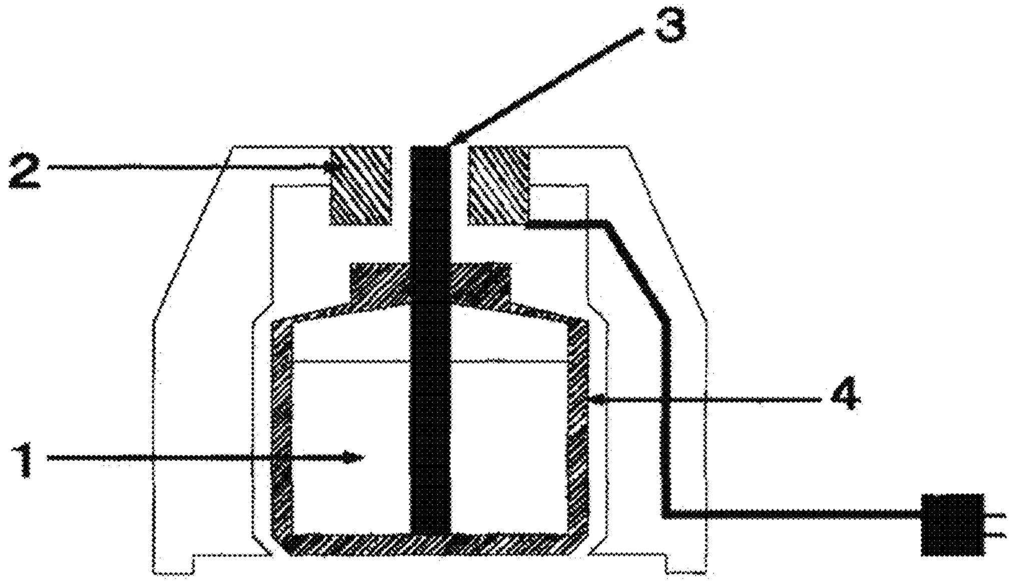
3
2
4
1

HEATING TRANSPIRATION COMPOSITION, AND METHOD FOR EXTERMINATING HARMFUL ARTHROPODS USING SAME

TECHNICAL FIELD

This application claims priority to and the benefit of Japanese Patent Application No. 2021-063990 filed Apr. 5, 2021, the entire contents of which are incorporated herein by reference.

The present invention relates to a heating transpiration composition, and a method for exterminating a harmful arthropod using the same.

BACKGROUND ART

To date, for the purpose of exterminating a harmful arthropod, various methods are studied. For example, the Patent document 1 describes a certain kind of heating transpiration composition shows an effect on exterminating a mosquito.

CITATION LIST

Patent Document

Patent Document 1: JP H09-268104 A

SUMMARY OF THE INVENTION

Problems to be Solved by Invention

However, in some cases, the above-mentioned heating transpiration composition does not show a sufficient efficacy on exterminating a harmful arthropod.

Means to Solve Problems

The present inventor has been studied to provide a heating transpiration composition showing excellent efficacy on exterminating a harmful arthropod. As a result, the inventor has found out that a heating transpiration composition comprising a natural pyrethrin and a pyrethroid compound at the specific ratio thereof exerts excellent efficacy on exterminating a harmful arthropod, and has completed the present invention.

The present invention include the following aspects, which are not limited thereto.

1. A heating transpiration composition which comprises a natural pyrethrin and a pyrethroid compound, wherein the weight ratio of the active ingredient of the natural pyrethrin relative to the pyrethroid compound is within the range of 20:1 to 200:1.
2. The heating transpiration composition according to the Item 1 wherein the pyrethroid compound is the pyrethroid compound having 0.00001 Pa to 0.1 Pa of a vapor pressure at 25° C.
3. The heating transpiration composition according to the Item 1 or 2 wherein the pyrethroid compound is one or more compounds selected from the group consisting of metofluthrin dimefluthrin, transfluthrin, profluthrin, meperfluthrin, heptafluthrin, tetramethylfluthrin, and renofluthrin.
4. An insect repellent incense comprising the composition according to any one of the Items 1 to 3.

5. A method for exterminating a mosquito using the composition or the insect repellent incense according to any one of Items 1 to 4.
6. A mat formulation comprising the composition according to any one of the Items 1 to 3.
7. A method for exterminating a mosquito using the composition according to any one of the Items 1 to 3 or the mat formulation according to the Item 6.
8. A heating transpiration pest control formulation comprising the composition according to any one of the Items 1 to 3.
9. A method for exterminating a mosquito using the composition or the heating transpiration pest control formulation according to any one of the Items 1 to 3 or the Item 8.

Effect of Invention

The heating transpiration composition of the present invention shows an excellent efficacy.

MODE FOR CARRYING OUT THE INVENTION

The natural pyrethrin to be used herein contains as an active ingredient, six kinds of the compounds such as Pyrethrin I, Pyrethrin II, Cinerin I, Cinerin II, Jasmoline I, and Jasmoline II.

The natural pyrethrin is available as an extract or a pyrethrum dry powder which can be obtained typically by collecting only calyxes of pyrethrum (scientific name: *Tanacetum cinerariifolium* or *Chrysanthemum cinerariaefolium*), followed by drying and pulverizing to powders, and then extracting them with appropriate solvents being able to solubilize active ingredients, for example, organic solvents such as methanol. The natural pyrethrin may contain in addition to the above-mentioned six kinds of compounds, plant-derived impurities (such as fatty acids and flavonoids). As examples of plants from which a natural pyrethrin can be obtained, in addition to the above-mentioned *Chrysanthemum cinerariaefolium* (*Tanacetum cinerariifolium*), Calendula (*Calendula officinalis*), Painted daisy (*Chrysanthemum coccinum*), Tagetes (*Tagetes erecta*), Wild marigold (*Tagetes minuta*), Common zinnia (*Zinnia elegans*), and Narrow-leaf zinnia (*Zinia linnearis*) have been known (see Reference document 1: Adnane. H. Alain, C. & Chantal, B. 2000. The Production of Pyrethrins by Plant Cell and Tissue Cultures of *Chrysanthemum cinerariaefolium* and Tagetes Species. Critical Reviews in Plant Sciences, 19(1):69-89; Reference document 2: Kudakasseril, G. J. and Staba, E. J. 1988. Insecticidal phytochemicals. In: Cell Culture and Somatic Cell Genetics of Plants. pp. 537-552. Constabel, F. and Vasil, I. K., Eds., Academic Press, New York; Reference document 3: John E. Casida, Gary B. Quistad. 1995. PYRETHRUM FLOWERS, Production, Chemistry, Toxicology, and Uses. pp. 123-125, Oxford University Press.).

The natural pyrethrin to be used herein is not limited to the above-mentioned one in terms of the plant species or varieties as their sources. The cultivation methods, cultivation conditions (such as climate, production areas, soil quality), harvesting timing, harvested parts, harvesting methods, washing methods, extracting methods, and purifying methods of the plants are not particularly limited. Examples of the natural pyrethrin to be used herein may encompass the natural pyrethrin which is obtained using a vector in which a gene encoding a pyrethrin biosynthetic enzyme is incorporated.

The weight ratio of six kinds of the compounds that are pyrethrin I, pyrethrin II, cinerin I, cinerin II, jasmoline I, and jasmoline II in the natural pyrethrin are not particularly limited, and each thereof may be set at an arbitrary weight ratio among the range of 0.001 to 99%. Typically, pyrethrin I is contained by 10 to 70% by weight, pyrethrin II is contained by 10 to 70% by weight, cinerin I is contained by 1 to 20% by weight, cinerin II is contained by 1 to 20% by weight, jasmoline I is contained by 1 to 20% by weight, and jasmoline II is contained by 1 to 20% by weight.

Examples of the natural pyrethrin include those containing pyrethrin I class (total amounts of pyrethrin I, cinerin I, and jasmoline I), and pyrethrin II class (total amounts of pyrethrin II, cinerin II, and jasmoline II) wherein the pyrethrin I class is contained by 20 to 40%, and the pyrethrin II class is contained by 12 to 31%, and the total amounts of the pyrethrin I class and the pyrethrin II class in the natural pyrethrin is usually 10 to 99%, preferably 15 to 90%, and more preferably 20 to 85%.

Since the natural pyrethrin is usually a plant extract, it may contain in addition to the above-mentioned six kinds of the compounds, impurities derived from plants, further, auxiliary components such as solvents and stabilizers. Petroleum-based solvents and vegetable-based solvents can be used as the solvents, and synthetic stabilizers and natural stabilizers can be used as the stabilizer.

The active ingredient of a natural pyrethrin to be described herein are referred to the pyrethrin I class and the pyrethrin II class, and the case where the weight ratio of the active ingredients of the natural pyrethrin relative to the pyrethroid compound is within the range of 20:1 to 200:1 is defined that the weight ratio of the total amounts of the pyrethrin I class and the pyrethrin II class relative to the pyrethroid compound is within the range of 20:1 to 200:1.

Examples of the pyrethroid compound to be described herein include the pyrethroid compound as described in the Reference document (The Pesticide manual, Eighteenth edition, J. A. Turner, British Crop Production Council, ISBN 978-1-9998966-1-4). In terms of the transpiration, the pyrethroid compounds having 0.00001 Pa to 0.1 Pa as a vapor pressure at 25° C. is preferably included. In terms of the transpiration and efficacy, more specific examples of the compounds include one or more compounds selected from the group consisting of metofluthrin, dimefluthrin, transfluthrin, profluthrin, meperfluthrin, heptafluthrin, tetramethylfluthrin and renofluthrin. The vapor pressure is measured according to the method as described in the Example 1 of JP 2006-284560 A.

The heating transpiration composition to be used herein can be described as the heating transpiration pest control composition in terms of its embodiment.

The formulations using the heating transpiration composition to be used herein are described below. Examples of the formulations using the heating transpiration composition include an insect repellent incense, a mosquito repellent mat, and a heating transpiration pest control formulation. However, it is not intended to be limited to the constitute composition which are described in the embodiments as explained below.

<Insect Repellent Incense>

The insect repellent incense to be described herein is typically composed of the above-mentioned heating transpiration composition, and carbide base material, combustion-supporting agent, bulking filler, binder, and the like.

Specific examples of the carbide base material include plant-derived carbide base materials such as charcoal, bamboo charcoal, plant activated charcoal, coconut shell charcoal, and coffee lees charcoal, as well as non-plant-derived carbide base materials such as carbon black, graphite, acetylene carbon black, calcic activated carbons, and petroleum activated carbons, and particularly preferably include plant-derived carbide base materials. Usually, they may be used alone or as a mixture of two or more kinds of them.

Examples of the combustion-supporting agent include plant dry powder such as wood powder, tab powder (bark powder of tab weed), lees powder (pyrethrum-extracting powder), epidermal powder of citrus, tee powder, palm oil powder, coconut shell powder, and walnut shell powder, and carbon powder such as charcoal powder, activated charcoal, and coal powder, and these may be used alone or as a mixture of two or more kinds of them.

Examples of the bulking filler include diatomaceous earth, talc, clay, kaolin and the like. These bulking fillers may be usually used alone or as a mixture of two or more kinds of them.

Examples of the binder include polymer compounds such as tab powder, starch (such as alpha starch, tapioca starch, corn starch, and wheat starch), casein, siam powder, methyl cellulose, carboxymethyl cellulose, and polyvinyl alcohol, and they are usually used alone or as a mixture of two or more kinds of them.

The compounding amounts of the carbide base material, the combustion-supporting agent, the bulking filler, and the binder may be adjusted appropriately freely depending on intended quality, and the total amount thereof is within a range of 85% by weight or more, and more preferably 90% by weight or more relative to the whole weight of a mosquito repellent incense.

The insect repellent incense to be described herein may be obtained by adding an appropriate amount of water to a mixture containing the heating transpiration composition and the insect repellent incense base material, and then kneading the resulting mixture, followed by molding with an extruder or a punching machine etc., and then air drying or heat drying of the resulting product.

The heating transpiration composition may not be mixed it directly with the mixture containing the insect repellent incense base material, and after molding only the insect repellent incense base material, and may be applied or sprayed as a solution agent containing the heating transpiration composition.

The shape of the insect repellent incense to be described herein is not particularly limited, and the shape of the sustainable mosquito repellent incense may be selected from stick, spiral, conical, or plate form and the like as necessary depending on intended use, and the stick, the spiral, or plate form is preferably included. The size thereof is not particularly limited, and for example, in the case where the shape of the insect repellent incense is a stick, the size is set as the range of preferably 100 mm or less as the whole length, 7 mm or less as the thickness, and 5 g or less as the weight, and more preferably from 20 mm or more to 90 mm or less as the whole length, from 2 mm or more to 5 mm or less as the thickness, and from 0.2 g or more to 3 g or less as the weight. In the case where the shape of the insect repellent incense is a spiral, the size is set as the range of preferably 150 cm or less as the whole length, 7 mm or less as the thickness, and 50 g or less as the weight, and more preferably from 30 cm or more to 90 cm or less as the whole length, from 2 mm or more to 5 mm or less as the thickness, and from 5 g or more to 20 g or less as the weight. In the case of the spiral type, the size is usually approximate degree of the range of 12 cm as a diameter, and about 3 to 5 mm as a thickness at one set in duplicate.

In actual use situation, usually, any flavor suitable for the insect repellent incense is often adhered, and recently, for the purpose of obtaining an aromatic effect or a relaxing effect, various flavor components having a volatility may be often added. Also in the insect repellent incense to be described herein, various flavor components may be added for the purpose of obtaining an aroma effect or a relaxing effect. The flavor components are listed as galaxolide, musk ketone, hexyl cinnamic aldehyde, Iso E super, methyl dihydrojasmonate, ethylene brassylate, geraniol, methyl atralate, hexyl salicylate, tricyclodecenyl acetate, oranger crystal, ambroxan, tonalide (6-acetyl-1,1,2,4,4,7-hexametyhyl tetralin), γ-undecalactone, Cashmeran, caron, heliotropine, dihydrondenyl-2,4-dioxane, α-isomethylionone, indole, methyl cedryl ketone, methyl β-naphthyl ketone, rose phenone, coumarin, vanilin, styrax resinoid, benzyl benzoate, undecanal, benzyl salicylate, ionone, α-ionone, β-ionone, Lily aldehyde, 3,5-dinitro-2,6-dimethyl-4-t-butylacetophenone, acetylcedrene, 2-cyclohexylidene-2-phenylacetaldehyde, isolongihoranone, cis-3-hexenol, and the others. These flavor components may be used alone or as a mixture of two or more of them. The contents of the flavor components are within the range of preferably 0.001 to 5% by weight, and more preferably 0.01 to 1% by weight, as relative to the whole weight of the insect repellent incense. In the case where the contents of the flavor component is less than 0.001% by weight, there is a probability of not bringing the flavor out sufficiently. In the case where the contents of the flavor component is over 5% by weight, there is any risk of producing an over-strengthened odor or stimulation.

The insect repellent incense to be described herein can contain as other components, a fungicide, an antiseptic, a stabilizer, an efficacy modifier, a deodorant and the like. The fungicide or antiseptic are listed as dehydroacetate, sorbate, p-hydroxy benzoate and the like. The stabilizer is listed as 2,6-di-tertiary-butyl-4-methylphenol (BHT), 2,2'-methylene bis(4-methyl-6-tertiary-butylphenol), 2,2'-methylenebis(4-ethyl-6-tertiary-butylphenol), 4,4-buthylidenebis(3-methyl-6-tertiary-butylphenol), 4,4'-thiobis(3-methyl-6-tertiary-buthylphenol), 2-tertiary-butyl-6-(3-tertiary-butyl-2-hydroxy-5-methylbenzyl)-4-methylphenyl acrylate, 2,4-di-tertiary-butylphenyl 3,5-di-tertiary-butyl-4-hydroxybenzoate and the like. The addition of the stabilizer can potentiate remarkably not only the over-time stability during the storage of the heating transpiration composition, but also stability of the same at smoking, and further can attribute to the improvement in sustained efficacy of the heating transpiration composition after the volatilization. The addition amount of the stabilizer is preferably compounded by 0.01 to 0.5 times relative to the amount of the heating transpiration composition. The efficacy modifies are listed as piperonyl butoxide, N-(2-ethylhexyl)-bicyclo [2,2,1]heptan-5-ene-2,3-dicarboxyimide, and the like. Also, any color agents such as malachite green, food additive (such as edible blue No. 1, edible yellow No. 4, edible red No. 106, and the like) may be contained in the insect repellent incense to be described herein.

<Mat Formulation>

The mat formulation to be described herein can be prepared by dipping a solution which is obtained by mixing the heating transpiration composition, and a solvent, a pigment, an antioxidant, a synergist, a stabilizer, a flavor and the like into a fibrous carrier or a porous carrier. The mat formulation can be used, for example, as an electric mosquito repellent mat.

Examples of the fibrous carrier include a natural fiber such as pulp, cellulose and cotton, a synthetic fiber such as polyester fiber and acrylic fiber, and an inorganic fiber such as glass fiber and asbestos, and the like. Examples of the porous carrier include a porous inorganic material such as diatomaceous earth, a porous magnetic material such as unglazed pottery, and a porous resin such as urethane foam and a foaming polypropylene.

The electric mosquito repellent mat is usually used as a size of approximate degree of 2.2 cm×3.5 cm×0.28 cm, which is not particularly limited to the shape, and it can be used by adjusting as necessary the amount or the ratio of the heating transpiration composition, or the other components to be compounded, depending on the shape, the size or the thickness of the mat. The contents to be described herein of the heating transpiration composition per one sheet of the mat with a size of 2.2 cm×3.5 cm×0.28 cm may be varied depending on the kinds or the contents of the heating transpiration composition, the usage time of the electric mosquito repellant mat, and the like, and is within an approximate degree of usually 1 to 2000 mg, and preferably 1 to 100 mg.

<Heating Transpiration Pest Control Formulation>

The heating transpiration pest control formulation to be described herein represents a formulation that can be used with a heating transpiration type of pest control apparatus as shown in FIG. 1. A solution 1 containing the heating transpiration composition is filled in a chemical bottle 4. A partial of the liquid-absorbing wick 3 is dipped into the solution 1, and it is configured that the solution containing the heating transpiration composition can be absorbed by the liquid-absorbing wick, and the upper part of the liquid-absorbing wick can be heated with a heater 2. The upper part of the liquid-absorbing wick is heated at a temperature of about 60° C. to about 135° C. indirectly with a heater 2, and the heating transpiration composition that is absorbed by the liquid-absorbing wick is transpired into an atmosphere so as to control a pest. The heating transpiration pest control formulation to be described herein is not limited to the apparatus as shown in FIG. 1, and can be applied with a conventionally-known heating transpiration type of pest control apparatus so as to exert excellent efficacy. The heating transpiration type of pest control apparatus to which the heating transpiration pest control formulation can be applied are described in, for example, JP S52-12106 A, Unity Model JP S58-45670 U, and JP 2012-176947 A.

In the heating transpiration pest control formulation as described herein, the heating transpiration composition is prepared in a form of the solution containing the heating transpiration composition (solution 1).

Examples of the solvent for preparing the heating transpiration pest control formulation include oily solvent or aqueous solvent.

In the case of using the oily solvent, the oily solvent having 350° C. or less as a boiling point is usually used. As the oily solvent, various kinds of organic solvents, typically any hydrocarbon solvents can be used, and aliphatic hydrocarbon having the range of 150 to 350 as a boiling point is particularly preferred. Examples of the solvent include preferably deodorized kerosene, n-paraffin, isoparaffin (such as IP solvent (manufactured by Idemitsu Kosan Co. Ltd.), Sewinglube (manufactured by ENEOS)). Examples of the organic solvents other than the above-mentioned hydrocarbons include glycerin, propylene glycol, methanol, acetone, xylene, chrorsen, isopropanol, and chloroform.

When the aqueous solvent is used, glycol ether or water is usually used. Examples of the glycol ether include ethylene glycol type of ether, propylene glycol type of ether, and dialkyl glycol type of ether, and ethylene glycol type of ether is preferably used. Examples of the ethylene glycol type of ether preferably include ethylene glycol monobutyl ether, and diethylene glycol monobutyl ether, propylene glycol monomethyl ether, propylene glycol monoethyl ether, and propylene glycol monopropyl ether. The glycol ether can be used as a mixture of one kind or two kinds or more of them. The weight ratio of the glycol ether and water is within the range of usually 1:0.4 to 1:8.5, preferably 1:1 to 1:8.5, and more preferably 1:1.4 to 1:3.6.

The concentration of the heating transpiration composition in the heating transpiration pest control formulation is adjusted to be usually about 6 to 80% by weight, preferably about 10 to 75% by weight, and more preferably about 15 to 50% by weight.

In the heating transpiration pest control formulation to be described herein, a thickener, a surfactant, a stabilizer, an antiseptic, and a synergist may be contained as other components.

Also as the heater that is used in the heating transpiration type of pest control apparatus (heater 2), a heater that generates a heat when energized is widely used, which is however limited thereto, and any publicly known heater such as an air oxidation exothermic material and a heating generating material using platinum catalyst may be used.

The liquid-absorbing wick 3 is in general composed of a porous material. Examples of the porous materials used include a product that is prepared by caking an inorganic powder such as clay, kaolin, diatomaceous earth, plaster, perlite, bentonite, acid clay, fiber glass, and asbestos with a glue such as carboxymethyl cellulose, starch, gum arabic, gelatin and polyvinyl alcohol, followed by molding the resulting mixture. The liquid-absorbing wick may contain as necessary a pigment, an antiseptic, or an antioxidant and the like, and for example, these components can be contained by mixing them when the above-mentioned inorganic powders and the glue are caked.

[0035]

Fig.1

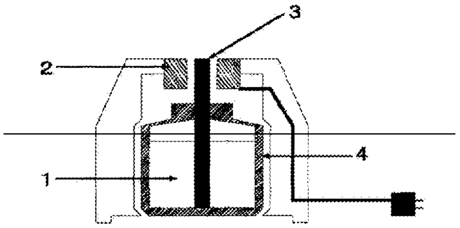

Examples of the pests to be controlled by the heating transpiration composition to be described herein or the formulation using the heating transpiration composition include any arthropods such as various kinds of insects and mites, and particularly, include harmful flying pests, including Diptera pests such as *Culex* species (for example, common house mosquito (*Culex pipiens pallens*)), *Culex tritaeniorhynchus*, or southern house mosquito (*Culex quinquefasciatus*)), *Aedes* species (for example, yellow fever mosquito (*Aedes Aegypti*), or tiger mosquito (*Aedes albopictus*)), *Anopheles* mosquito species (for example, *Anopheles sinensis*), midges (Chironomidae), house flies (Muscidae) (for example, house fly (*Musca domestica*), false stable fly (*Muscina stabulans*), or *Fannia* (*Fannia canicularis*)), blowflies (Calliphoridae), fleshflies (Sarcophagidae), fruit flies (Drosophilidae), moth flies (Psychodidae), hump backed flies (Phoridae), horseflies (Tabanidae), and biting midges (Ceratopogonidae). Among them, typical examples of the pests to be controlled include mosquitos such as *Culex* species, *Aedes* species, and *Anopheles* mosquito species.

EXAMPLES

Hereinafter, the present invention is explained in more detail by using Preparation examples and Test examples, however, the present invention should not be limited to these examples.

Preparation Example (Kneaded Insect Repellent Incense 1)

A natural pyrethrin 1 part by weight, dimefluthrin 0.05 parts by weight, and as a combustion-supporting agent, tab powder 39 parts by weight, lees powder 30 parts by weight, and wood powder 30 parts by weight are mixed, and a green pigment 0.3 parts by weight is further added thereto, and after the resulting mixture is mixed homogeneously with stirring, water 120 parts by weight is added thereto, and the resulting mixture is kneaded thoroughly. After the kneaded mixture is molded to a sheet shape, punched out to a spiral shape, the resulting mixture is dried to make an approximate degree of 7 to 10% by weight of moisture contents to prepare the insect repellent incense formulation of the present invention.

Preparation Example 2 (Kneaded Insect Repellent Incense 2)

A natural pyrethrin 1 part by weight, dimefluthrin 0.05 parts by weight, and wood powder 50 parts by weight as a carbide base material, a mixed flavor containing galaxolide and musk ketone etc., 0.8 parts by weight as a flavor component, lees powder 17 parts by weight and wood powder 10.7 parts by weight as a combustion-supporting agent, a diatomaceous earth 3 parts by weight as a bulking filler, and alpha($\alpha$) starch 14 parts by weight and carboxymethyl cellulose 3 parts by weight as a binder are mixed, and water 90 parts by weight is added thereto, and the resulting mixture is kneaded thoroughly. The kneaded mixture is subjected to an extruder to mold to a stick shape, and thereafter, the resulting product is dried to make an approximate degree of 7 to 10% by weight of moisture contents to prepare the insect repellent incense formulation of the present invention.

Preparation Example 3 (Mat Formulation 1)

A solution 120 mg that is prepared by mixing a natural pyrethrin 10.5 parts by weight, transfluthrin 0.5 parts by weight, acetyl tributyl citrate 39.5 parts by weight, isononyl adipate 39.5 parts by weight, a blue pigment 5 parts by weight, and a flavor 5 parts by weight is dipped homogeneously into a base material for an electric mat with 2.1 cm×3.4 cm of a breadth, and 0.22 cm of a thickness (fibrous carrier composed of a pulp and a cotton linter) to prepare an electric mosquito repellent mat formulation of the present invention.

Preparation Example 4 (Mat Formulation 2)

1,4-Dibutylaminoanthraquinone 8 mg and 1,8-bis(phenylthio)dodecahydroanthraquinone 40 mg are dissolved in a solution 5 g that is composed of a natural pyrethrin 20.0% by weight, metofluthrin 1.0% by weight, dibutyl hydroxytoluene 10% by weight, isononly adipate 25% by weight, acetyl tributyl citrate 30% by weight, and isoparaffinic solvent (manufactured by Showa Shell Sekiyu K.K., Product name: Merveille 40) 14.0% by weight, and the resulting solution 120 mg is dipped homogeneously into a base material for an electric mat with 2.2 cm×3.5 cm of a breadth, and 0.28 cm of a thickness (fibrous carrier composed of a pulp and a cotton linter) to prepare an electric mosquito repellent mat formulation of the present invention.

Preparation Example 5 (Mat Formulation 3)

1,4-Dibutylaminoanthraquinone 8 mg and 1,8-bis(phenylthio)dodecahydroanthraquinone 40 mg are dissolved in a solution 5 g that is composed of a natural pyrethrin 50.0% by weight, metofluthrin 0.25% by weight, dibutyl hydroxytoluene 15% by weight, isononly adipate 4.75% by weight, acetyl tributyl citrate 20% by weight, and isoparaffinic solvent (manufactured by Showa Shell Sekiyu K.K., Product name: Merveille 40) 10.0% by weight, and the resulting solution 500 mg is dipped homogeneously into a base material for an electric mat with 2.2 cm×3.5 cm of a breadth, and 0.28 cm of a thickness (fibrous carrier composed of a pulp and a cotton linter) to prepare an electric mosquito repellent mat formulation of the present invention.

Preparation Example 6 (Mat Formulation 4)

1,4-Dibutylaminoanthraquinone 8 mg and 1,8-bis(phenylthio)dodecahydroanthraquinone 40 mg are dissolved in a solution 5 g that is composed of a natural pyrethrin 50.0% by weight, metofluthrin 0.25% by weight, dibutyl hydroxytoluene 15% by weight, isononly adipate 4.75% by weight, acetyl tributyl citrate 20% by weight, and isoparaffinic solvent (manufactured by Showa Shell Sekiyu K.K., Product name: Merveille 40) 10.0% by weight, and the resulting solution 2000 mg is dipped homogeneously into a base material for an electric mat with 2.2 cm×3.5 cm of a breadth, and 0.28 cm of a thickness (fibrous carrier composed of a pulp and a cotton linter) to prepare an electric mosquito repellent mat formulation of the present invention.

Preparation Example 7 (Heating Transpiration Pest Control Formulation 1)

Sewinglube N-15 (manufactured by ENEOS Co. Ltd., 50% distillation temperature: about 265° C.) is mixed with a natural pyrethrin 2.0 parts by weight, metofluthrin 0.1 parts by weight, and IP solvent 2028 (manufactured by Idemitsu Kosan Co. Ltd., 50% distillation temperature: about 233° C.) 9.965 parts by weight to make 100 parts by weight, and the resulting solution is filled in a plastic container with 45 mL volume, and a porous liquid-absorbing wick whose upper part thereof can be heated with a heater through an inner plug is inserted to prepare a heating transpiration pest control formulation of the present invention.

Preparation Example 8 (Heating Transpiration Pest Control Formulation 2)

A natural pyrethrin 10.5 parts by weight, and metofluthrin 0.5 parts by weight are mixed in deodorized kerosene 89 parts by weight, and dissolved therein, and the resulting solution is filled in a vinyl chloride container with 45 mL volume, and a porous liquid-absorbing wick whose upper part thereof can be heated with a heater through an inner plug (a product that is prepared by hardening an inorganic powder with a binder followed by a sintering the resulting material) is inserted into the container to prepare a heating transpiration pest control formulation of the present invention.

Preparation Example 9 (Heating Transpiration Pest Control Formulation 3)

A natural pyrethrin 0.5 parts by weight, and metofluthrin 0.5 parts by weight are mixed in diethylene glycol monobutyl ether 50 parts, dibutyl hydroxytoluene 18 parts, and water 46.7 parts, and dissolved therein, and the resulting solution is filled in a plastic container with 45 mL volume, and a porous liquid-absorbing wick whose upper part thereof can be heated through an inner plug is inserted into the container to prepare a heating transpiration pest control formulation of the present invention.

Hereinafter, the effect of the present invention is shown by Test Examples.

Preparation of Testing Formulation (Insect Repellent Incense)

Wood powder 75 parts by weight, tab powder 5 parts by weight, lees powder 5 parts by weight, siam powder 10 parts by weight, and tapioca starch powder 5 parts by weight were mixed, and appropriate amount of water was added thereto and the resulting mixture was kneaded thoroughly. The kneaded mixture was molded to a sheet shape, and punched out to a spiral shape, and thereafter, the resulting mixture was dried to make an approximate degree of 7 to 10% by weight of moisture contents to prepare the blank insect repellent incense.

The acetone solution of the testing compounds that were diluted to make the prescribed concentrations were applied dropwise uniformly to the obtained blank insect repellent incense, and then air-dried to prepare the test formulation.

Test Example 1

Common house mosquito (*Culex pipiens pallens*) female adult insects 20 were placed in the glass tube with 4.5 cm of a diameter and 12 cm of a height, and they were shut in the glass tube by covering the opening parts of the top and the bottom thereof with a nylon net having 16 mesh by a rubber band. A metallic cylinder with 22 cm of a diameter and 83 cm of the height was installed and set up, and two (2) of the above glass tube in which common house mosquito (*Culex pipiens pallens*) were placed were installed in the upper opening part and then fixed. The formulation that was prepared according to the above process was set to fire, and set up in the bottom opening part of the metallic cylinder. Six (6) minutes later, the number of individuals of knockdowned common house mosquito (*Culex pipiens pallens*) were recorded. The experiments were conducted in triple replicates to calculate a knockdown ratio (hereinafter, abbreviated as "KD ratio"). Also the KD ratios that would be expected in the case of mixing of the natural pyrethrin and each pyrethroid compound is calculated by a Colby equation from the KD ratio of the case where each of the above compounds is used alone respectively, and the calculated values are indicated together in Table 1 below.

The concentration of the natural pyrethrin represents the concentration of active ingredients of the natural pyrethrin.

Theoretical expected value based on Colby equation $$(\%)=A+(100-A)\times B/100$$

In the above equation, "A" and "B" represent the numerical values below.

"A": KD ratio (%) in the case where only "A" is treated,

"B": KD ratio (%) in the case where only "B" is treated.

TABLE 1

| Concentration of Active Ingredient (s) (%) KD ratio when used alone | | Mixed ratio | Effect of mixture | |
|---|---|---|---|---|
| A | B | A:B | Expected value | KD ratio |
| Natural pyrethrin 1.0% KD ratio 11.7% | Metofluthrin 0.01% KD ratio 30.0% | 100:1 | 38.2% | 93.3% |

Test Example 2

Common house mosquito (*Culex pipiens pallens*) female adult insects 20 were placed in the glass tube with 4.5 cm of a diameter and 12 cm of a height, and they were shut in the glass tube by covering the opening parts of the top and the bottom thereof with a nylon net having 16 mesh by a rubber band. A metallic cylinder with 22 cm of a diameter and 83 cm of the height was installed and set up, and two (2) of the above glass tube in which common house mosquito (*Culex pipiens pallens*) were placed were installed in the upper opening part and then fixed. The formulation that was prepared according to the above process was set to fire, and set up in the bottom opening part of the metallic cylinder. Seven (7) minutes later, the number of knockdowned (hereinafter, abbreviated as "KD") individuals were recorded. The experiments were conducted in triple replicates to calculate the KD ratio.

Also the KD ratios that would be expected in the case of mixing of the natural pyrethrin and each pyrethroid compound is calculated by a Colby equation from the KD ratio of the case where each of the above compounds is used alone respectively, and the calculated values are indicated together in Table 2 below.

TABLE 2

| Concentration of Active Ingredient (s) (%) KD ratio when used alone | | Mixed ratio | Effect of mixture | |
|---|---|---|---|---|
| A | B | A:B | Expected value | KD ratio |
| Natural pyrethrin 1.0% KD ratio 21.7% | Metofluthrin 0.01% KD ratio 75.0% | 100:1 | 80.4% | 100% |
| Natural pyrethrin 1.0% KD ratio 21.7% | Dimefluthrin 0.005% KD ratio 2.7% | 200:1 | 23.8% | 80.0% |
| Natural pyrethrin 0.25% KD ratio 5.0% | Transfluthrin 0.01% KD ratio 10.0% | 25:1 | 14.5% | 65.0% |
| Natural pyrethrin 0.5% KD ratio 13.8% | Transfluthrin 0.005% KD ratio 5.0% | 100:1 | 18.1% | 35.0% |
| Natural pyrethrin 0.5% KD ratio 13.8% | Transfluthrin 0.01% KD ratio 10.0% | 50:1 | 22.4% | 90.0% |
| Natural pyrethrin 1.0% KD ratio 21.7% | Transfluthrin 0.005% KD ratio 5.0% | 200:1 | 25.6% | 90.0% |
| Natural pyrethrin 1.0% KD ratio 21.7% | Transfluthrin 0.01% KD ratio 10.0% | 100:1 | 29.5% | 93.3% |
| Natural pyrethrin 0.125% KD ratio 5.0% | Dimefluthrin 0.01% KD ratio 68.3% | 12.5:1 | 69.9% | 23.3% |

Test Example 3

Common house mosquito (*Culex pipiens pallens*) female adult insects 20 were placed in the glass tube with 4.5 cm of a diameter and 12 cm of a height, and they were shut in the glass tube by covering the opening parts of the top and the bottom thereof with a nylon net having 16 mesh by a rubber band. A metallic cylinder with 22 cm of a diameter and 83 cm of the height was installed and set up, and two (2) of the above glass tube in which common house mosquito (*Culex pipiens pallens*) were placed were installed in the upper opening part and then fixed. The formulation that was prepared according to the above process was set to fire, and set up in the bottom opening part of the metallic cylinder. Ten (10) minutes later, the number of knockdowned (hereinafter, abbreviated as "KD") individuals were recorded. The experiments were conducted in triple replicates to calculate the KD ratio.

Also the KD ratios that would be expected in the case of mixing of the natural pyrethrin and each pyrethroid compound is calculated by a Colby equation from the KD ratio of the case where each of the above compounds is used alone respectively, and the calculated values are indicated together in Table 3 below.

TABLE 3

| Concentration of Active Ingredient (s) (%) KD ratio when used alone | | Mixed ratio | Effect of mixture | |
|---|---|---|---|---|
| A | B | A:B | Expected value | KD ratio |
| Natural pyrethrin 0.25% KD ratio 36.7% | Transfluthrin 0.005% KD ratio 81.7% | 50:1 | 88.4% | 96.7% |
| Natural pyrethrin 0.25% KD ratio 36.7% | Transfluthrin 0.01% KD ratio 81.7% | 200:1 | 88.4% | 98.3% |
| Natural pyrethrin 0.5% KD ratio 67.2% | Transfluthrin 0.005% KD ratio 45.0% | 100:1 | 82.0% | 95.0% |
| Natural pyrethrin 1.0% KD ratio 81.7% | Dimefluthrin 0.005% KD ratio 45.0% | 12.5:1 | 89.9% | 100% |

As shown in Test Examples 1 to 3, it was demonstrated that the insect repellent incense of the present invention wherein the natural pyrethrin and each of the pyrethroid compounds were contained at the prescribed degree of mixed ratio thereof can exert higher effect than the effect that would be expected from the effects that were exerted by the natural pyrethrin or each of the pyrethroid compounds used alone respectively.

Test Example 4

Common house mosquito (*Culex pipiens pallens*) female adult insects 20 are placed in the glass tube with 4.5 cm of a diameter and 12 cm of a height, and they are shut in the glass tube by covering the opening parts of the top and the bottom thereof with a nylon net having 16 mesh by a rubber band. A metallic cylinder with 22 cm of a diameter and 83 cm of the height is installed and set up, and two (2) of the above glass tube in which common house mosquito (*Culex pipiens pallens*) are placed are installed in the upper opening part and then fixed. The mat formulations of the present invention that are prepared according to the Preparation Example 3 or 4 are obtained. The mat formulation is set to a commercially available pesticide mat heater, and is set up in the opening part of the bottom of the metallic cylinder, and a heating is conducted. Ten (10) minutes later, the number of knockdowned (hereinafter, abbreviated as "KD") individuals of common house mosquito (*Culex pipiens pallens*) are recorded, and the KD ratio is calculated. It can be confirmed that the mat formulations of the present invention wherein the natural pyrethrin or each of the pyrethroid compounds is contained at the prescribed degree of the mixed ratio thereof exert higher effect than the effects that would be expected from the effect that is exerted by the natural pyrethrin or each of the pyrethroid compounds used alone respectively.

Examples of the heating transpiration composition that is used for the mat formulation whose high effect can be confirmed by the Test Examples as described herein include the heating transpiration compositions as shown in Table 4.

TABLE 4

| Concentration of Active Ingredient (s) (%) | | Mixed ratio |
|---|---|---|
| A | B | A:B |
| Natural pyrethrin 2% | Metofluthrin 0.1% | 20:1 |
| Natural pyrethrin 10.5% | Metofluthrin 0.5% | 21:1 |
| Natural pyrethrin 4% | Metofluthrin 0.2% | 20:1 |
| Natural pyrethrin 4% | Metofluthrin 0.1% | 40:1 |
| Natural pyrethrin 4% | Metofluthrin 0.05% | 80:1 |
| Natural pyrethrin 5% | Metofluthrin 0.05% | 100:1 |
| Natural pyrethrin 5% | Metofluthrin 0.025% | 200:1 |
| Natural pyrethrin 4% | Transfluthrin 0.2% | 20:1 |
| Natural pyrethrin 4% | Transfluthrin 0.1% | 40:1 |
| Natural pyrethrin 4% | Transfluthrin 0.05% | 80:1 |
| Natural pyrethrin 5% | Transfluthrin 0.05% | 100:1 |
| Natural pyrethrin 5% | Transfluthrin 0.025% | 200:1 |
| Natural pyrethrin 4% | Dimefluthrin 0.2% | 20:1 |
| Natural pyrethrin 4% | Dimefluthrin 0.1% | 40:1 |
| Natural pyrethrin 4% | Dimefluthrin 0.05% | 80:1 |
| Natural pyrethrin 5% | Dimefluthrin 0.05% | 100:1 |
| Natural pyrethrin 5% | Dimefluthrin 0.025% | 200:1 |
| Natural pyrethrin 4% | Profluthrin 0.2% | 20:1 |
| Natural pyrethrin 4% | Profluthrin 0.1% | 40:1 |
| Natural pyrethrin 4% | Profluthrin 0.05% | 80:1 |
| Natural pyrethrin 5% | Profluthrin 0.05% | 100:1 |
| Natural pyrethrin 5% | Profluthrin 0.025% | 200:1 |
| Natural pyrethrin 4% | Meperfluthrin 0.2% | 20:1 |
| Natural pyrethrin 4% | Meperfluthrin 0.1% | 40:1 |
| Natural pyrethrin 4% | Meperfluthrin 0.05% | 80:1 |
| Natural pyrethrin 5% | Meperfluthrin 0.05% | 100:1 |
| Natural pyrethrin 5% | Meperfluthrin 0.025% | 200:1 |

It can be confirmed from the Test Example 4 that the mat formulations of the present invention wherein the natural pyrethrin and each of the pyrethroid compounds are contained at the prescribed degree of the mixed ratio thereof exert higher effect than the effects that are expected from the effect that is exerted by the natural pyrethrin or each of the pyrethroid compounds used alone respectively.

Test Example 5

Common house mosquito (*Culex pipiens pallens*) female adult insects 20 are placed in the glass tube with 4.5 cm of a diameter and 12 cm of a height, and they are shut in the glass tube by covering the opening parts of the top and the bottom thereof with a nylon net having 16 mesh by a rubber band. A metallic cylinder with 22 cm of a diameter and 83 cm of the height is installed and set up, and two (2) of the above glass tube in which common house mosquito (*Culex pipiens pallens*) are placed are installed in the upper opening part and then fixed. The heating transpiration pest control formulation of the present invention that is prepared according to the Preparation Example 7, 8 or 9 are obtained. The heating transpiration pest control formulation is set up to the heating transpiration type of pest control apparatus as shown in FIG. 1, and is set up in the bottom of the opening part of the metallic cylinder, and a heating is conducted. Ten (10) minutes later, the number of knockdowned (hereinafter, abbreviated as "KD") individuals of common house mosquito (*Culex pipiens pallens*) are recorded, and the KD ratio is calculated. It can be confirmed that the heating transpiration pest control formulations of the present invention wherein the natural pyrethrin and each of the pyrethroid compounds are contained at the prescribed degree of the mixed ratio thereof exert higher effect than the effect that would be expected from the effect that is exerted by the natural pyrethrin or each of the pyrethroid compounds used alone respectively.

Examples of the heating transpiration compositions that are used for the heating transpiration pest control formulation whose high effect can be confirmed by the Test Examples as described herein include the heating transpiration compositions as shown in Table 5.

TABLE 5

| Concentration of Active Ingredient (s) (%) | | Mixed ratio |
|---|---|---|
| A | B | A:B |
| Natural pyrethrin 2% | Metofluthrin 0.1% | 20:1 |
| Natural pyrethrin 10.5% | Metofluthrin 0.5% | 21:1 |
| Natural pyrethrin 4% | Metofluthrin 0.2% | 20:1 |
| Natural pyrethrin 4% | Metofluthrin 0.1% | 40:1 |
| Natural pyrethrin 4% | Metofluthrin 0.05% | 80:1 |
| Natural pyrethrin 5% | Metofluthrin 0.05% | 100:1 |
| Natural pyrethrin 5% | Metofluthrin 0.025% | 200:1 |
| Natural pyrethrin 4% | Transfluthrin 0.2% | 20:1 |
| Natural pyrethrin 4% | Transfluthrin 0.1% | 40:1 |
| Natural pyrethrin 4% | Transfluthrin 0.05% | 80:1 |
| Natural pyrethrin 5% | Transfluthrin 0.05% | 100:1 |
| Natural pyrethrin 5% | Transfluthrin 0.025% | 200:1 |
| Natural pyrethrin 4% | Dimefluthrin 0.2% | 20:1 |
| Natural pyrethrin 4% | Dimefluthrin 0.1% | 40:1 |
| Natural pyrethrin 4% | Dimefluthrin 0.05% | 80:1 |
| Natural pyrethrin 5% | Dimefluthrin 0.05% | 100:1 |
| Natural pyrethrin 5% | Dimefluthrin 0.025% | 200:1 |
| Natural pyrethrin 4% | Profluthrin 0.2% | 20:1 |
| Natural pyrethrin 4% | Profluthrin 0.1% | 40:1 |
| Natural pyrethrin 4% | Profluthrin 0.05% | 80:1 |
| Natural pyrethrin 5% | Profluthrin 0.05% | 100:1 |
| Natural pyrethrin 5% | Profluthrin 0.025% | 200:1 |
| Natural pyrethrin 4% | Meperfluthrin 0.2% | 20:1 |
| Natural pyrethrin 4% | Meperfluthrin 0.1% | 40:1 |
| Natural pyrethrin 4% | Meperfluthrin 0.05% | 80:1 |
| Natural pyrethrin 5% | Meperfluthrin 0.05% | 100:1 |
| Natural pyrethrin 5% | Meperfluthrin 0.025% | 200:1 |

It can be confirmed from the Test Example 5 that the heating transpiration pest control formulations of the present invention wherein the natural pyrethrin and each of the pyrethroid compounds are contained at the prescribed degree of the mixed ratio thereof exert higher effect than the effect that would be expected from the effect that is exerted by the natural pyrethrin or each of the pyrethroid compounds used alone respectively.

INDUSTRIAL APPLICABILITY

The heating transpiration composition of the present invention can be used to control harmful arthropods.

The invention claimed is:

1. A heating transpiration composition, comprising
a natural pyrethrin and
a pyrethroid compound,
wherein a weight ratio of the natural pyrethrin relative to the pyrethroid compound is within the range of 20:1 to 200:1, and the pyrethroid compound is the pyrethroid compound having 0.00001 Pa to 0.1 Pa of a vapor pressure at 25° C. wherein the pyrethroid compound comprises one or more compounds selected from the group consisting of metofluthrin, dimefluthrin, transfluthrin, profluthrin, meperfluthrin, heptafluthrin, tetramethylfluthrin, and renofluthrin.

2. An insect repellent incense comprising the composition according to claim 1.

3. A method for exterminating a mosquito, comprising adding the heating transpiration composition according to claim 1 to an insect repellent incense.

4. A mat formulation comprising the heating transpiration composition according to claim 1.

5. A method for exterminating a mosquito, comprising using the heating transpiration composition according to claim 1.

6. A heating transpiration pest control formulation comprising the heating transpiration composition according to claim 1.

7. A method for exterminating a mosquito, comprising using the heating transpiration composition according to claim 1.

8. The heating transpiration composition according to claim 1, wherein the weight ratio of the natural pyrethrin relative to the pyrethroid compound is within the range of 25:1 to 200:1.

9. The heating transpiration composition according to claim 1, wherein the weight ratio of the natural pyrethrin relative to the pyrethroid compound is within the range of 50:1 to 200:1.

10. The heating transpiration composition according to claim 1, wherein the weight ratio of the natural pyrethrin relative to the pyrethroid compound is within the range of 25:1 to 100:1.

11. The heating transpiration composition according to claim 1, wherein the pyrethroid compound comprises metofluthrin.

12. The heating transpiration composition according to claim 1, wherein the pyrethroid compound comprises dimefluthrin.

13. The heating transpiration composition according to claim 1, wherein the pyrethroid compound comprises transfluthrin.

14. The heating transpiration composition according to claim 1, wherein the pyrethroid compound comprises profluthrin.

15. The heating transpiration composition according to claim 1, wherein the pyrethroid compound comprises meperfluthrin.

16. The heating transpiration composition according to claim 1, wherein the pyrethroid compound comprises heptafluthrin.

17. The heating transpiration composition according to claim 1, wherein the pyrethroid compound comprises tetramethylfluthrin.

18. The heating transpiration composition according to claim 1, wherein the pyrethroid compound comprises renofluthrin.

* * * * *